United States Patent
Grob et al.

(10) Patent No.: US 6,893,255 B2
(45) Date of Patent: May 17, 2005

(54) SPRAY BURNER FOR THE THERMAL DECOMPOSITION OF SULPHUR-CONTAINING RESIDUES

(75) Inventors: Gerhard Grob, Willich (DE); Heinz Gruning, Biblis (DE)

(73) Assignees: Messer Griesheim GmbH, Frankfurt (DE); Roehm GmbH & Co., KG, Darmstadt (DE)

( * ) Notice: Subject to any disclaimer, the term of this patent is extended or adjusted under 35 U.S.C. 154(b) by 0 days.

(21) Appl. No.: 10/380,444

(22) PCT Filed: Sep. 7, 2001

(86) PCT No.: PCT/EP01/10347

§ 371 (c)(1),
(2), (4) Date: Aug. 11, 2003

(87) PCT Pub. No.: WO02/23089

PCT Pub. Date: Mar. 21, 2002

(65) Prior Publication Data

US 2004/0023179 A1 Feb. 5, 2004

(30) Foreign Application Priority Data

Sep. 7, 2001 (DE) .......................... 100 45 322

(51) Int. Cl.⁷ ............................. F23G 7/00; F23G 14/20
(52) U.S. Cl. ............................ 431/284; 431/5; 239/422; 239/424
(58) Field of Search ............................ 431/5, 187, 284; 239/422, 423, 424, 428; 110/238

(56) References Cited

U.S. PATENT DOCUMENTS

| | | | |
|---|---|---|---|
| 4,544,350 A | | 10/1985 | Ware |
| 5,123,836 A | * | 6/1992 | Yoneda et al. .................. 431/5 |
| 5,129,335 A | * | 7/1992 | Lauwers ...................... 110/238 |
| 5,266,025 A | * | 11/1993 | Francis et al. ............... 431/187 |
| 5,954,491 A | * | 9/1999 | Helton et al. ............... 431/187 |
| 5,957,678 A | * | 9/1999 | Endoh et al. .................. 431/5 |
| 6,494,711 B1 | * | 12/2002 | Takemura et al. .......... 239/422 |

FOREIGN PATENT DOCUMENTS

| | | |
|---|---|---|
| DE | 19 30 496 A | 1/1971 |
| EP | 0 509 193 A | 10/1992 |
| GB | 1306561 | * 2/1973 |

* cited by examiner

Primary Examiner—Sara Clarke

(57) ABSTRACT

The aim of the invention is to produce a spray burner, starting from a conventional spray burner, for the atomisation and combustion of sulphur-containing residues, comprising a residue nozzle, for the introduction of sulphur-containing residue, which is surrounded by an outer nozzle, for the introduction of an atomising agent, whereby said burner is suitable for a method in which oxygen can be introduced in the cracking oven as additional oxidising agent to increase the capacity and improve the economic efficiency without the above disadvantages and limitations and is also optimised for a variable throughput of residue for atomising. Said aim is achieved whereby the residue nozzle comprises a multiplicity of individual nozzles which may be switched on and off, connected to an input for the residue, an inlet for fuel is provided and the outer nozzle is connected to an inlet for an oxygen-enriched gas stream.

17 Claims, 1 Drawing Sheet

SPRAY BURNER FOR THE THERMAL DECOMPOSITION OF SULPHUR-CONTAINING RESIDUES

Figure 1:
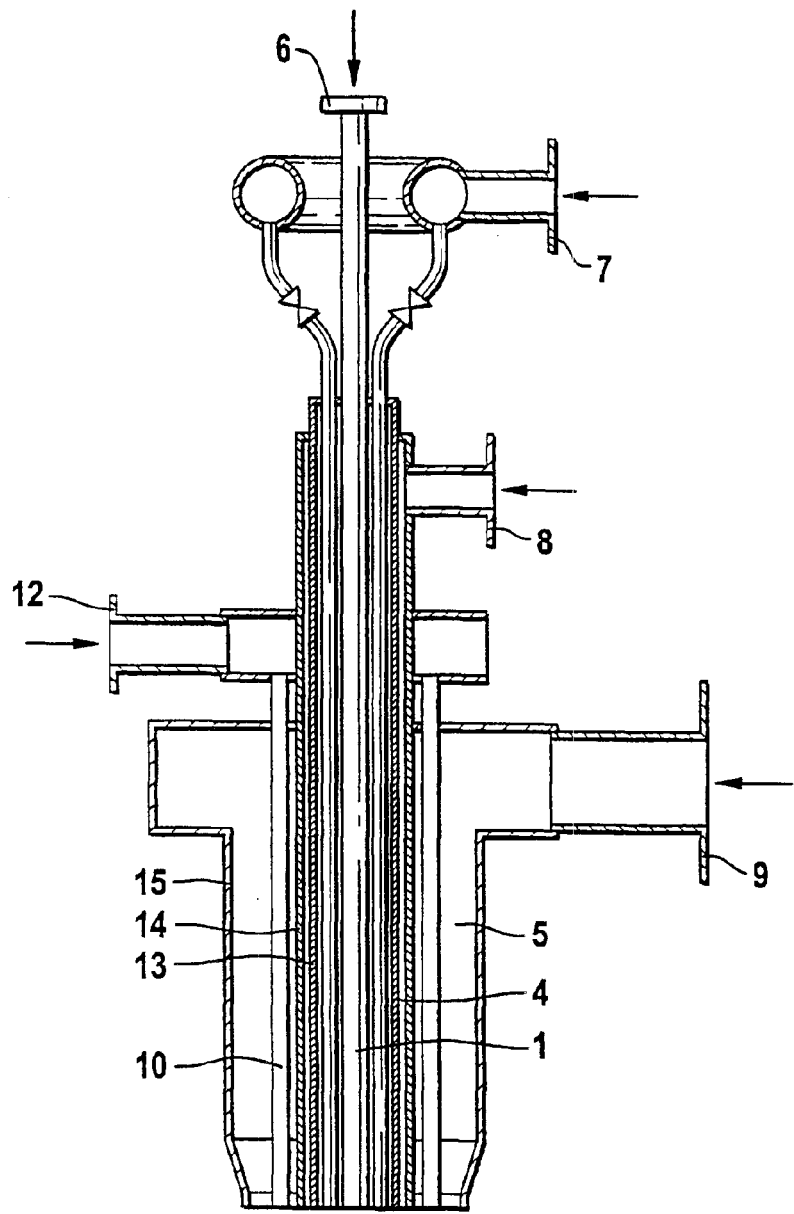

The present invention relates to an atomizing burner for the atomization and combustion of residues containing sulfur, comprising a residue nozzle that feeds in the residue containing sulfur and that is surrounded by an outer nozzle that feeds in an atomizing medium.

Such atomizing burners are used in the treatment of liquid residues containing sulfur. According to the state of the art, residues containing sulfur such as, for example, spent sulfuric acids (so-called "waste sulfuric acids") or ammonia sulfate solutions, are treated by means of thermal cleavage in so-called cleaving installations. In this process, the residues are fed into a heating zone of a reactor with a refractory lining, hereinafter referred to as a "cleaving oven", said heating zone being created by hot flue gases, where these residues are thermally cleaved under formation of sulfur dioxide. The heating zone is created by burning a fuel with an oxidant that contains oxygen. The process gases containing sulfur dioxide are further processed according to the state of the art into sulfuric acid, fuming sulfuric acid or sulfur dioxide.

Two different types of reactors are commonly used, which differ primarily in terms of the process gas flow, namely, cleaving ovens with a vertical or with a horizontal flow.

In the case of cleaving ovens with a vertical flow, the burners for generating the hot flue gases are flanged directly onto the oven wall radially or tangentially in one or more planes. The flame first develops in the cleaving oven, whereby CO and soot might form as a result of incomplete combustion, and there is a risk that the sulfuric acid produced could acquire a brown coloration. Therefore, the more modern cleaving installations are equipped with upstream combustion chambers, called combustors, rather than with the directly flanged-on burners. Combustors generate a hot, fully reacted flue gas at a temperature of about 2000° C. [3632° F.].

With the horizontally arranged cleaving oven, usually one or more burners or combustors are flanged directly onto the end wall. The flame or the flue gas exit horizontally.

Examples of possible fuels are combustible gases and liquid fuels, preferably with a high sulfur content, such as, for example, fuel oil. If there is a need to increase the sulfuric acid production, liquid sulfur is also added as the fuel, and it burns directly in the cleaving oven to form sulfur dioxide. The oxidation medium normally used is air, which is either added to the burner box at the ambient temperature or else recuperatively heated.

All cleavage methods have in common the requisite very high cleavage temperature of 900° C. to 1200° C. [1652° F. to 2192° F.] at which the residues containing sulfur are converted into sulfur dioxide, water vapor, oxygen and optionally nitrogen and carbon dioxide. The strong endothermic cleavage reaction takes place in the cleaving ovens described above, requiring large amounts of energy in the form of combustible gas or oil. Thus, for example, theoretically, about 1770 KWh of energy per ton of waste acid are needed for the cleavage of a 70%-solution of waste sulfuric acid, consisting of 70% sulfuric acid and 30% water.

When air is used as the oxidant, the inert nitrogen fraction also has to be heated to the cleavage temperature of about 1000° C. [1832° F.], thus additionally raising the energy consumption and reducing the sulfur dioxide concentration as well as increasing the process gas volume.

In principle, the specific disposal costs per ton of waste acid can be reduced by increasing the sulfur dioxide concentration in the process gas.

Higher sulfur dioxide concentrations can be achieved either by concentrating the residues containing sulfur in a separate installation or by reducing the inert nitrogen fraction in the combustion air, which is normally achieved by using oxygen as the oxidation medium.

In order to mix oxygen with the fuels in the cleaving oven, so far, the following methods have proven their worth in actual practice:

enrichment of the combustion air with oxygen,
injection of oxygen into the air flame,
use of a fuel/oxygen burner.

As a result of the oxygen enrichment and/or the oxygen injection, the flame temperature rises, which can cause damage to the burners and/or to the refractory lining.

During the oxygen enrichment as well as during the oxygen injection, the temperature of the flame is raised, thus promoting the thermal formation of nitrogen oxide, which is fundamentally disadvantageous for the cleaving process.

When a fuel/oxygen burner is used, fuels such as oil or combustible gas are burned by means of a suitable burner, while being mixed externally with oxygen. The oxygen burners can additionally be integrated into the reactor so as to improve the performance of an existing cleaving oven, or else to replace air burners. The very high flame temperatures of up to 2900° C. [5252° F.] give rise to the same problems as with the previously mentioned methods. Moreover, water-cooled oxygen burners are maintenance-intensive since corrosion damage can occur on the cooled surfaces due to the condensation of sulfuric acid.

Owing to these drawbacks, the use of oxygen to improve the performance of cleaving installations used for regenerating residues containing sulfur has only been possible to a limited extent. Thus, for example, cleaving ovens that were equipped with combustors could not be operated with oxygen until now because the oxygen enrichment as well as the oxygen injection cause the flame temperature to rise so that the refractory lining of the combustor, which is already being operated at its upper temperature limit, melts and moreover, due to the increased formation of nitrogen oxide, the quality of the produced sulfuric acid is greatly diminished due to elevated content of nitrosyl sulfuric acid.

The acid is fed into the cleaving oven by means of pressure atomizers, compressed-air atomizers or rotary atomizers that are made of acid-proof materials.

All types of atomizers have in common the atomizing nozzle positioned centrally in the atomizer through which the entire amount of residue containing sulfur passes.

It is known that the degree of thermal cleavage of residues containing sulfur is inversely proportional to the size of the atomized droplets in the cleaving oven. As a matter of principle, a higher degree of cleavage is achieved with small droplets of liquid.

When it comes to high-pressure atomizers and injector atomizers such as, for example, a compressed-air atomizer, the size of the atomized liquid droplets is proportional to the inner diameter of the atomizing nozzle and to the atomizing pressure. Therefore, atomizing nozzles are optimized for a prescribed pressure and throughput rate. Consequently, atomizing nozzles that were dimensioned for the maximum throughput of waste acid no longer function optimally under partial load conditions.

Therefore, the present invention is based on the objective of providing an atomizing burner that can be used, on the one hand, for a process in which oxygen can be introduced into the cleavage oven without the above-mentioned drawbacks and limitations as an additional oxidation medium in order to enhance the performance and improve the cost-effectiveness and that, on the other hand, is optimized for a variable throughput rate of the residue that is to be atomized.

Using the above-mentioned atomizing burner, this objective is achieved according to the invention in that the residue nozzle comprises a plurality of individual nozzles that can be turned on or off and that are connected to an inlet for the residue, in that a feed inlet is provided for the fuel and in that the outer nozzle is connected to an inlet for an oxygen-rich gas stream.

Thanks to the plurality of individual nozzles in the atomizing burner according to the invention, instead of the central atomized liquid cone known from the state of the art, several individual atomized liquid cones are formed with the residue that is to be treated.

The individual nozzles are designed so that they can be turned on or off, as a result of which the throughput of residue through the individual nozzles can be adapted to the requirements at hand. In this manner, it is especially possible to ensure that, when the throughput is increased or decreased, a droplet size ascertained to be optimal can be maintained for at least some of the individual nozzles in that the throughput through one or more of the individual nozzles is turned on or off.

Moreover, the atomizing burner according to the invention has a feed inlet for fuel and for an oxygen-rich gas. The burning of the fuel with the oxygen-rich gas supplies cleaving energy in the area of the atomizing burner—and thus in a pre-reaction zone that is separate from the actual reaction zone. In this pre-reaction zone, the residue containing sulfur is partially cleaved and only then is it fed into the reaction zone consisting of the hot flue gases at a higher temperature, where the residue is then completely cleaved. Since the pre-reaction zone is thus separate from the actual reaction zone, the additional energy needed in the pre-reaction zone to enhance the performance can be supplied without this causing an increase in the flame temperature in the actual reaction zone and hence without exceeding the temperature limits in this area or else increasing the formation of nitrogen oxide.

Due to the joint introduction of the residue and of the fuel into the pre-reaction zone and the partial cleavage of the residue, the thermal cleavage of the residue can be carried out in the actual reaction zone at low reaction temperatures, which translates into a low formation of nitrogen oxide at high reaction rates in the overall process. The reaction products from the pre-reaction zone that had not yet been completely cleaved are transferred to the actual reaction zone having a higher temperature, where the complete cleavage and combustion of the reaction products takes place without the additional formation of nitrogen oxide.

The oxygen-rich gas stream consists of pure oxygen or of an oxygen-air mixture with an oxygen concentration between 25 vol.-% and 100 vol.-%. It surrounds the droplet streams of residue and fuel as these are formed and it serves as the oxidant and, at the same time, as the secondary atomizing medium.

An especially precise and variable adaptation to the throughput rate is achieved with an atomizing burner in which the individual nozzles are designed so that they can be turned on or off. For this purpose, for example, each individual nozzle can be associated with a valve.

In particular, an atomizing burner in which the number of individual nozzles is at least 2 and at the most 9 has proven its worth. As the number of individual nozzles increases, the optimization of the droplet size to the momentary throughput becomes more precise. The upper limit indicated results from the increasing demands associated with an increasing number of individual nozzles. Normally, a symmetrical arrangement of the individual nozzles—in the direction of the lengthwise axis of the atomizing burner—is preferred since this facilitates the production of the atomizing burner as well as the homogeneous mixing and reproducible distribution of the residue, of the fuel and of the oxygen in the pre-reaction zone.

In a preferred embodiment of the atomizing burner, there is a central inner nozzle that feeds in the fuel and individual nozzles arranged around the central inner nozzle. In order to generate the cleaving energy needed in the pre-reaction zone, liquid and/or gaseous fuel is injected through the central inner nozzle of the atomizing burner into the droplet streams consisting of residues containing sulfur that is coming out of the individual nozzles. The fuel penetrates the droplet streams and reacts with the oxygen-rich gas, thus creating the above-mentioned pre-reaction zone. Aside from the fuel, other components can also be introduced into the pre-reaction zone via the inner nozzle, especially a mixture of fuel and residue, whereby in that case, the inner nozzle is connected to an inlet for the residue. Consequently, the inner nozzle should also be considered to be an individual nozzle as set forth in this invention.

As an alternative or supplement to this, the cleaving energy needed in the pre-reaction zone is generated by mixing liquid fuel with the residue containing sulfur outside of the atomizing burner and by injecting the residue-fuel mixture into the reactor through the individual nozzles. Therefore, advantageously, the individual nozzles are connected to a mixing device that makes the mixture consisting of residue and fuel.

The atomizing burner according to the invention makes it possible to atomize the residue while feeding in an oxygen-rich gas stream through the outer nozzle. In order to protect the individual nozzles or the inner nozzle against chemical attack by the oxygen-rich gas stream, it has proven to be advantageous to provide an inert gas nozzle between the individual nozzles and the outer nozzle. By feeding a suitable inert gas through the inert gas nozzle, the individual nozzles and—if present—the inner nozzle are protected against the oxygen-rich gas stream. Consequently, it is possible to make the individual nozzles and/or the inner nozzle out of a material that would otherwise be susceptible to corrosion under ambient conditions.

Preferably, the individual nozzles and—if present—the inner nozzle are made of zirconium. Zirconium stands out for its high acid resistance and durability, but at high temperatures (for example, at 1000° C. [1832° F.]), due to its affinity, it oxidizes readily or might even be ignited in pure oxygen, which is prevented by the medium fed in through the inert gas nozzle.

An especially simple embodiment of the atomizing burner is one in which the outer nozzle is configured as an annular gap that coaxially surrounds the inert gas nozzle.

In an alternative and likewise preferred embodiment of the atomizing burner, the outer nozzle is configured as an annular gap in which a plurality of tubular nozzles are distributed along the outer perimeter of the inert gas nozzle. With this embodiment of the atomizing burner, a first gas can be fed in through the annular gap and a second gas through the tubular nozzles. For example, the first gas can be preheated air and the second gas can be an oxygen-rich gas stream as set forth in this invention, having an oxygen content of preferably at least 80 vol.-%.

Figure 2:
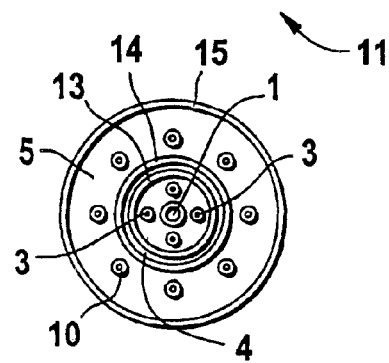

Below, the invention will be explained in greater depth with reference to embodiments and a drawing. The drawing shows the following in detail:

FIG. 1—the atomizing burner according to the invention in a first embodiment, and FIG. 2—the atomizing burner according to FIG. 1 in a top view of the opening of the atomizing nozzle.

The atomizing burner shown in FIG. 1 has a central inner nozzle 1 around which a bundle of a total of four individual nozzles 3 are uniformly distributed. The inner nozzle 1 and the individual nozzles 3 are coaxially surrounded by an ring-shaped gas separation nozzle 4 and by another ring-shaped outer nozzle 5. The inner nozzle 1 has an inlet 6 that feeds in fuel. The individual nozzles 3 are connected to an inlet 7 via which the individual nozzles 3 are supplied either with fuel containing sulfur or else with a mixture of fuel and residue containing sulfur.

In an alternative embodiment of the atomizing burner, the inner nozzle 1 is also connected to an inlet (not shown in FIG. 1) that feeds in a mixture of fuel and residue containing sulfur.

Thus, via the inlets 6 and 7, either a mixture of fuel and residue containing sulfur is fed to the atomizing burner or else the residue is fed in via the inlet 7 separately from the fuel (inlet 6). In the latter case, either liquid fuel (such as light or heavy oil, waste oil or solvent) or else a combustion gas (such as natural gas, propane, butane or other combustible gases) is fed in through the inlet 6 while the residue containing sulfur is fed in through the inlet 7.

The gas separation nozzle 4 is provided with an air inlet and the outer nozzle 5 is provided with an inlet 9 for an oxygen-air mixture whose oxygen content can be varied between 20.6 vol.-% and 100 vol.-% and that can be heated to a temperature of up to 600° C. [1112° F.].

Inside the ring-shaped outer nozzle 5, there is a plurality of tubular nozzles 10 (in the embodiment there are eight tubular nozzles 10), which have a circular cross section. The tubular nozzles 10 are distributed evenly around the gas separation nozzle 4. They consist of tubes made of austenitic material whose upper end facing away from the nozzle opening 11 is connected to an oxygen inlet 12 that feeds in technically pure oxygen.

Through this arrangement of the individual nozzles, the oxygen is separated from the preheated oxygen-air mixture until the nozzle opening 11. In this manner, any desired amount of oxygen or air can be safely fed into the oven.

The top view of the opening of the atomizing nozzle according to FIG. 2 shows the coaxial arrangement of the individual tubes (13; 14; 15) and of the nozzles (1, 3, 5) as well as the arrangement of the circular tubular nozzles 10 around the gas separation nozzle 4 and of the individual nozzles 3 around the inner nozzle 1 in the atomizing burner according to FIG. 1.

The individual nozzles 3 and the inner nozzle 1 are formed by a tube bundle made of zirconium. The other walls of the nozzles (4; 5) consist of a heat-proof, sulfur-resistant, high-alloy stainless steel in the form of two coaxial tubes (14; 15).

The advantages of the atomizing burner according to the invention in comparison to the atomizing burners according to the state of the art are compiled below in bulleted form:

Optimization of the droplet size and of the atomizing pressure in the waste acid in the case of varying amounts of waste acid by independently turning on or off individual atomizing nozzles Long service life of the individual atomizing nozzles due to the use of zirconium as the material in view of the inert gas introduced through the gas separation nozzle, even when pure oxygen is used as the atomizing and oxidation medium Performance increase due to the use of an oxygen-rich gas as the oxidation agent with the formation of a pre-reaction zone having a lower temperature into which oxygen, fuel and residue are introduced together, where the residue is partially cleaved and only then fed into the actual reaction zone having a higher temperature.

What is claimed is:

1. An atomizing burner for the atomization and combustion of residues containing sulfur, comprising a residue nozzle that feeds in the residue containing sulfur that is surrounded by an outer nozzle that feeds in an atomizing medium, characterized in that the residue nozzle comprises a plurality of individual nozzles that can be turned on or off and that are connected to an inlet for the residue, a feed inlet being provided for fuel, the outer nozzle being connected to an inlet for an oxygen-rich gas stream, and the individual nozzles being designed so that they can be turned on or off individually.

2. The atomizing burner according to claim 1, characterized in that the number of individual nozzles is from 2 to 9.

3. The atomizing burner according to claim 2, characterized in that there is a central inner nozzle that feeds in the fuel and the individual nozzles being arranged around the central inner nozzle.

4. The atomizing burner according to claim 3, characterized in that the individual nozzles are connected to a mixing device that makes the mixture consist of residue and fuel.

5. The atomizing burner according to claim 4, characterized in that there is an inert gas nozzle between the individual nozzles and the outer nozzle.

6. The atomizing burner according to claim 5, characterized in that the individual nozzles are made of zirconium.

7. The atomizing burner according to claim 6, characterized in that the outer nozzle is configured as an annular gap that coaxially surrounds the inert gas nozzle.

8. The atomizing burner according to claim 7, characterized in that the outer nozzle comprises an annular gap in which a plurality of tubular nozzles are distributed along the outer perimeter of the inert gas nozzle.

9. The atomizing burner according to claim 5, characterized in that the outer nozzle is configured as an annular gap that coaxially surrounds the inert gas nozzle.

10. The atomizing burner according to claim 1, characterized in that the number of individual nozzles is from 2 to 9.

11. The atomizing burner according to claim 1, characterized in that there is a central inner nozzle that feeds in the fuel and the individual nozzles being arranged around the central inner nozzle.

12. The atomizing burner according to claim 1, characterized in that the individual nozzles are made of zirconium.

13. The atomizing burner according to claim 1, characterized in that there is an inert gas nozzle between the individual nozzles and the outer nozzle.

14. An atomizing burner for the atomization and combustion of residues containing sulfur, comprising a residue nozzle that feeds in the residue containing sulfur that is surrounded by an outer nozzle that feeds in an atomizing medium, characterized in that the residue nozzle comprises a plurality of individual nozzles that can be turned on or off and that are connected to an inlet for the residue, a feed inlet being provided for fuel, the outer nozzle being connected to an inlet for an oxygen-rich gas stream, and the individual nozzles are connected to a mixing device that makes the mixture consist of residue and fuel.

15. The atomizing burner according to claim 14, characterized in that there is an inert gas nozzle between the individual nozzles and the outer nozzle.

16. An atomizing burner for the atomization and combustion of residues containing sulfur, comprising a residue nozzle that feeds in the residue containing sulfur that is surrounded by an outer nozzle that feeds in an atomizing medium, characterized in that the residue nozzle comprises a plurality of individual nozzles that can be turned on or off and that are connected to an inlet for the residue, a feed inlet being provided for fuel, the outer nozzle being connected to an inlet for an oxygen-rich gas stream, and the outer nozzle comprises an annular gap in which a plurality of tubular nozzles are distributed along the outer perimeter of the inert gas nozzle.

17. The atomizing burner according to claim 16, characterized in that there is an inert gas nozzle between the individual nozzles and the outer nozzle.

* * * * *